United States Patent
Meekhof et al.

(10) Patent No.: US 9,639,166 B2
(45) Date of Patent: May 2, 2017

(54) BACKGROUND MODEL FOR USER RECOGNITION

(71) Applicant: Microsoft Technology Licensing, LLC, Redmond, WA (US)

(72) Inventors: Casey Meekhof, Redmond, WA (US); Robert M. Craig, Bellevue, WA (US); Craig Peeper, Kirkland, WA (US); Patrick O. Cook, Monroe, WA (US); Ketan Dalal, Seattle, WA (US); Vladimir Tankovich, Bellevue, WA (US); Anton Rakovchuk, Mill Creek, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 121 days.

(21) Appl. No.: 14/645,220

(22) Filed: Mar. 11, 2015

(65) Prior Publication Data

US 2016/0266650 A1    Sep. 15, 2016

(51) Int. Cl.
*G06K 9/00* (2006.01)
*G06F 3/01* (2006.01)
(Continued)

(52) U.S. Cl.
CPC .............. *G06F 3/017* (2013.01); *G06F 3/005* (2013.01); *G06K 9/00335* (2013.01);
(Continued)

(58) Field of Classification Search
CPC ..... G06F 3/017; G06T 7/0065; G06T 7/2033; G06T 7/20; G06T 2207/10016;
(Continued)

(56) References Cited

U.S. PATENT DOCUMENTS 6,577,307 B1 * 6/2003 Hsiao .................... G06T 15/503
345/421
7,366,325 B2    4/2008 Fujimura et al.
(Continued)

OTHER PUBLICATIONS

Fernandez-Sanchez, et al., "Background Subtraction Based on Color and Depth Using Active Sensors", In Proceedings of IEEE Sensors, Nov. 3, 2013, 21 pages.

*Primary Examiner* — Amir Alavi
(74) *Attorney, Agent, or Firm* — Alleman Hall Creasman & Tuttle LLP (57) ABSTRACT

A computer system comprises a hardware interface, a computer-memory device, an update engine, and a posture-recognition engine. The hardware interface is configured to receive depth video of an environment from a camera. The computer-memory device stores a background model of the environment preservable over a reboot of the computer system, the background model including a plurality of trusted coordinates derived from the depth video. The update engine is configured to update the background model, including moving a trusted coordinate to greater depth if an observed pixel is behind the trusted coordinate over a first duration, but retaining the trusted coordinate if the observed pixel depth is in front of the trusted coordinate over the first duration. The posture-recognition engine is configured to recognize posture of a user in front of a background portion of the video, which is bounded by the trusted coordinates of the background model.

12 Claims, 6 Drawing Sheets

(51) Int. Cl.
*G06T 7/00* (2017.01)
*G09G 5/18* (2006.01)
*G06K 9/46* (2006.01)
*G06F 3/00* (2006.01)

(52) U.S. Cl.
CPC .......... G06K 9/4661 (2013.01); G06T 7/0065 (2013.01); G09G 5/18 (2013.01)

(58) Field of Classification Search
CPC ............ G06K 9/00335; G06K 9/4661; G06K 9/3233; G06K 9/00777; G09G 5/18
See application file for complete search history.

(56) References Cited

U.S. PATENT DOCUMENTS

| | | | |
|---|---|---|---|
| 7,623,676 B2 * | 11/2009 | Zhao | G06K 9/00369 348/580 |
| 7,664,315 B2 * | 2/2010 | Woodfill | G06K 9/00791 345/419 |
| 7,831,087 B2 | 11/2010 | Harville | |
| 8,401,225 B2 | 3/2013 | Newcombe et al. | |
| 8,565,485 B2 | 10/2013 | Craig et al. | |
| 8,570,320 B2 | 10/2013 | Izadi et al. | |
| 8,594,425 B2 * | 11/2013 | Gurman | G06K 9/00201 382/154 |
| 8,625,897 B2 | 1/2014 | Criminisi et al. | |
| 8,670,029 B2 | 3/2014 | Mceldowney | |
| 8,787,663 B2 | 7/2014 | Litvak et al. | |
| 8,818,028 B2 * | 8/2014 | Nguyen | H04N 5/272 382/103 |
| 8,873,852 B2 * | 10/2014 | Zhang | G06T 7/0081 382/103 |
| 9,152,243 B2 * | 10/2015 | Gu | G06K 9/00208 |
| 9,401,039 B2 * | 7/2016 | Maeda | G06T 15/08 |
| 9,478,039 B1 * | 10/2016 | Wang | G06T 7/0081 |
| 2012/0056800 A1 | 3/2012 | Williams et al. | |
| 2013/0243326 A1 | 9/2013 | Billingham et al. | |
| 2014/0056471 A1 | 2/2014 | Gu | |
| 2014/0119640 A1 | 5/2014 | Craig | |
| 2014/0139633 A1 | 5/2014 | Wang et al. | |
| 2016/0266650 A1 * | 9/2016 | Meekhof | G06F 3/017 |

* cited by examiner

BACKGROUND MODEL FOR USER RECOGNITION

BACKGROUND

A computer system may be coupled to a camera system, which is configured to acquire video of a user. Through analysis of the video, the user's posture and/or gestures may be recognized and provided as input to software executing on the computer system. Input provided in this manner is especially attractive in video-game applications. In particular, the computer system may be configured to observe and decipher real-world postures and/or gestures corresponding to in-game actions. The task of determining a user's posture and/or gesture is not trivial, however; it requires a sophisticated combination of hardware and software. One of the outstanding challenges in this area is to accurately distinguish the user's body from a complex background in the acquired depth video.

SUMMARY

One embodiment provides a computer system comprising a hardware interface, a computer-memory device, an update engine, and a posture-recognition engine. The hardware interface is configured to receive depth video of an environment from a camera. The computer-memory device stores a background model of the environment preservable over a reboot of the computer system, the background model including a plurality of trusted coordinates derived from the depth video. The update engine is configured to update the background model, including moving a trusted coordinate to greater depth if an observed pixel depth is behind the trusted coordinate over a first duration, but retaining the trusted coordinate if the observed pixel depth is in front of the trusted coordinate over the first duration, and moving the trusted coordinate to lesser depth if the observed pixel depth is in front of the trusted coordinate over a second, longer duration. The posture-recognition engine is configured to ignore a background portion of the depth video, but to recognize posture of a user in front of the background portion, the background portion being bounded by the plurality of trusted coordinates of the background model.

This Summary is provided to introduce in a simplified form a selection of concepts that are further described in the Detailed Description below. This Summary is not intended to identify key features or essential features of the claimed subject matter, nor is it intended to be used to limit the scope of the claimed subject matter. Neither is the claimed subject matter limited to implementations that solve the prior disadvantages noted in this disclosure.

DETAILED DESCRIPTION

Components, process steps, and other elements that may be substantially the same in one or more embodiments are identified coordinately and are described with minimal repetition. It will be noted, however, that elements identified coordinately may also differ to some degree. It will be further noted that the drawing figures listed above are schematic and generally not drawn to scale. Rather, the various drawing scales, aspect ratios, and numbers of components shown in the figures may be purposely distorted to make certain features or relationships easier to see.

Figure 1:
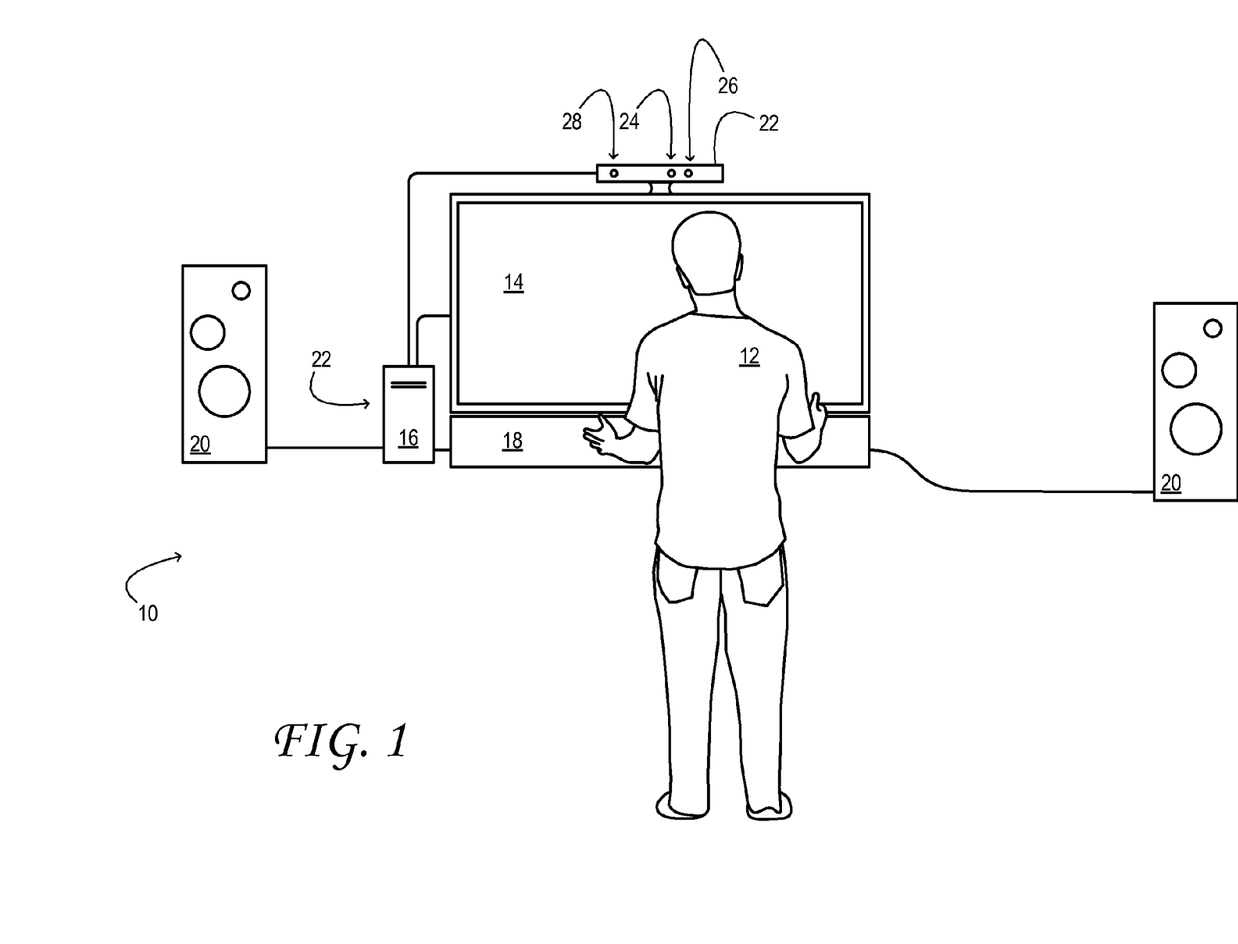
FIG. 1 shows an example environment in which a user's posture is recognized and provided as input to a computer system.

FIG. 1 shows an environment 10, where a computer-system user 12 is standing in front of large-format, flat screen display 14. Display 14 may be a stereoscopic 3D display in some embodiments, or a conventional 2D display in others. Computer system 16 is operatively coupled to the display and to other components, such as audio-video (A/V) receiver 18 and loudspeakers 20. In one embodiment, the computer system may be a game console. In another embodiment, the computer system may be a multipurpose personal computer or workstation. Additional aspects of the computer system are described hereinafter.

In some embodiments, user 12 may interact with computer system 16 and associated components via conventional input devices—a keyboard, touch-screen, mouse, game-system controller, and/or wireless remote, for example. Alternatively, or in addition, the computer system may respond to 'natural user input' (NUI), where the user's speech, hand gestures, and/or eye movements are sensed, interpreted, and used to control the computer system.

To this end, computer system 16 in FIG. 1 is operatively coupled to peripheral camera system 22. The illustrated peripheral camera system includes an infrared (IR) or near IR (NIR) illumination source 24, a depth camera 26, and a flat-image camera 28. The peripheral camera system may also include a microphone 30 (not shown in FIG. 1) for receiving speech or other audible input from user 12. Although a peripheral camera system is shown in FIG. 1, other embodiments may include a camera system integrated to the computer system.

Depth camera 26 may be configured to acquire a time-resolved sequence of depth maps of user 12 and other aspects of environment 10. As used herein, the term 'depth map' refers to an array of pixels registered to corresponding regions $(X_i, Y_i)$ of an imaged scene, with a depth value $Z_i$ indicating, for each pixel, the depth of the corresponding region. 'Depth' is defined as a coordinate parallel to the optical axis of the depth camera, which increases with increasing distance from the depth camera. Operationally, a depth camera may be configured to acquire 2D image data, from which a depth map is obtained via downstream processing. Likewise, the term 'depth video' refers herein to a time-resolved sequence of depth maps.

In general, the nature of depth camera 26 may differ in the various embodiments of this disclosure. In one embodiment, brightness or color data from two, stereoscopically oriented imaging arrays in the depth camera may be co-registered and used to construct a depth map. In other embodiments, illumination source 24 may be configured to project onto the subject a structured illumination pattern comprising numerous discrete features—e.g., lines or dots. An imaging array in the depth camera may be configured to image the structured illumination reflected back from the subject. Based on the spacings between adjacent features in the various regions of the imaged subject, a depth map of the subject may be constructed. In still other embodiments, the illumination source may project pulsed IR or NIR illumination towards the subject. A pair of imaging arrays in the depth camera may be configured to detect the pulsed illumination reflected back from the subject. Both arrays may include an electronic shutter synchronized to the pulsed illumination, but the integration times for the arrays may differ, such that a pixel-resolved time-of-flight of the pulsed illumination, from the illumination source to the subject and then to the arrays, is discernible based on the relative amounts of light received in corresponding elements of the two arrays.

Via any suitable objective-lens system, flat-image camera 28 detects light over a range of field angles, mapping such angles to corresponding pixels of a rectangular pixel array. In one embodiment, the flat-image camera may detect the light in a plurality of wavelength channels—e.g., red, green, blue, etc.—each associated with a subset of the pixels of the array. Alternatively, a monochromatic flat-image camera may be used, which images visible, IR, NIR, and/or ultraviolet (UV) light in grayscale. Color or brightness values for all of the pixels exposed in the flat-image camera constitute collectively a digital image. In some embodiments, depth camera 26 and flat-image camera 28 are arranged with parallel optical axes oriented in the same direction. In some embodiments, image or video output from the depth and flat-image cameras may be co-registered and combined into a unitary (e.g., RGB+depth) data structure or stream. In embodiments in which depth camera 26 is a suitably configured time-of-flight depth camera, a data stream representing both depth and brightness (e.g., IR+depth) may be available by combining outputs differing in phase. Accordingly, the 'depth video' referred to herein may subsume a time-resolved series of co-registered depth and brightness images.

Figure 2:
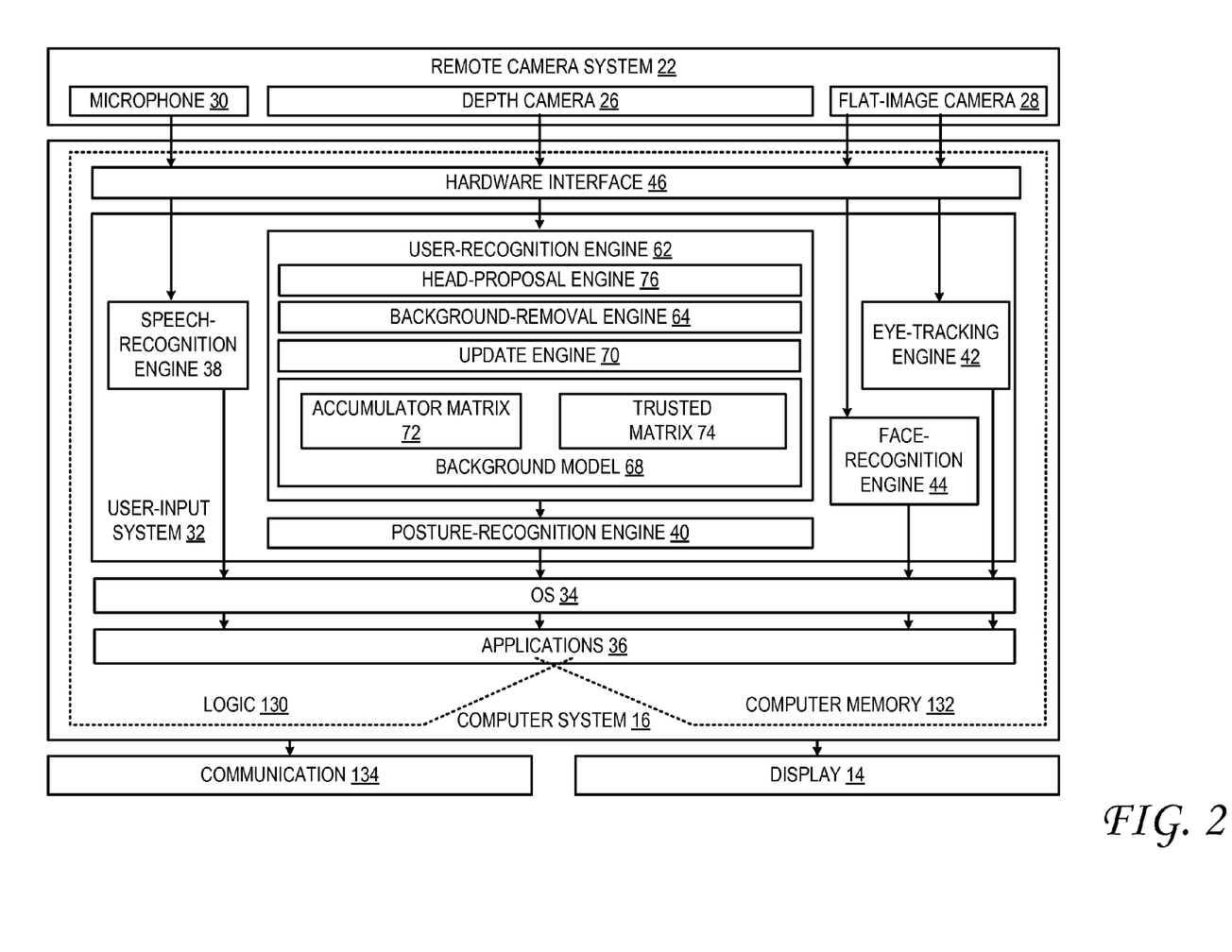
FIG. 2 shows aspects of an example computer system and peripheral camera system.

FIG. 2 shows additional aspects of computer system 16 and peripheral camera system 22 in one embodiment. Here, the sensory data from peripheral camera system 22 is processed by one or more NUI engines of user-input system 32 of computer system 16, to reveal actionable user input. Such input is parsed by operating system (OS) 34 or by application code 36, thereby controlling the operation of the computer system. In the embodiment of FIG. 2, the user-input system includes a speech-recognition engine 38, a posture-recognition engine 40, and an eye-tracking engine 42, and a face-recognition engine 44.

Speech-recognition engine 38 is configured to process audio data from microphone 30, to recognize certain words or phrases in the user's speech, and to generate corresponding actionable input to OS 34 or application code 36. Posture-recognition engine 40 is configured to receive at least the depth video from depth camera 26 of peripheral camera system 22. Depth and flat-image video acquired in environment 10 are received via a wired or wireless hardware interface 46—a universal serial bus (USB), WiFi, or Bluetooth interface, for example. The posture-recognition engine is further configured to process at least the depth video from peripheral camera system 22, to identify one or more human subjects in the depth video, to compute various geometric (e.g., skeletal) features of the subjects identified, and to gather from the geometric features various postural or gestural information to be used as NUI.

In one non-limiting embodiment, posture-recognition engine 40 identifies at least a portion of one or more human subjects in the depth video. Through appropriate depth-image processing, a given locus of a depth map may be recognized as belonging to a human subject. In a more particular embodiment, pixels that belong to a human subject may be identified (e.g., by sectioning off a portion of a depth map that exhibits above-threshold motion over a suitable time scale) and a generalized geometric model of a human being may be derived from those pixels.

In one embodiment, each pixel of a depth map may be assigned a person index that identifies the pixel as belonging to a particular human subject or non-human element. As an example, pixels corresponding to a first human subject can be assigned a person index equal to one, pixels corresponding to a second human subject can be assigned a person index equal to two, and pixels that do not correspond to a human subject can be assigned a person index equal to zero. Person indices may be determined, assigned, and saved in any suitable manner.

Posture-recognition engine 40 also may make the determination as to which human subject (or subjects) will provide user input to computer system 16—i.e., which will be identified as the user. In some embodiments, a human subject may be selected as the user based on proximity to display 14 or depth camera 26, and/or position in a field of view of the depth camera. More specifically, the user selected may be the human subject closest to the depth camera or nearest the center of the field of view of the depth camera.

Posture-recognition engine 40 is configured to process posture information on the user, which is derived computationally from the depth video. In some embodiments, additional sensory input—e.g., image data from a flat-image camera 28 or audio data from microphone 30—may be processed along with the posture information.

In some embodiments, posture-recognition engine 40 may be configured to analyze the pixels of a depth map that correspond to the user, in order to determine what part of the user's body each pixel corresponds to. A variety of different body-part assignment techniques can be used to this end. In one example, each pixel of the depth map with an appropriate person index (vide supra) may be assigned a body-part index. The body-part index may include a discrete identifier, confidence value, and/or body-part probability distribution indicating the body part or parts to which that pixel is likely to correspond.

In some embodiments, machine-learning may be used to assign each pixel a body-part index and/or body-part probability distribution. The machine-learning approach analyzes a user with reference to information learned from a previously trained collection of known poses. During a supervised training phase, for example, a variety of human subjects may be observed in a variety of poses; trainers provide ground truth annotations labeling various machine-learning classifiers in the observed data. The observed data and annotations are then used to generate one or more machine-learned algorithms that map inputs (e.g., depth video) to desired outputs (e.g., body-part indices for relevant pixels).

Figure 3:
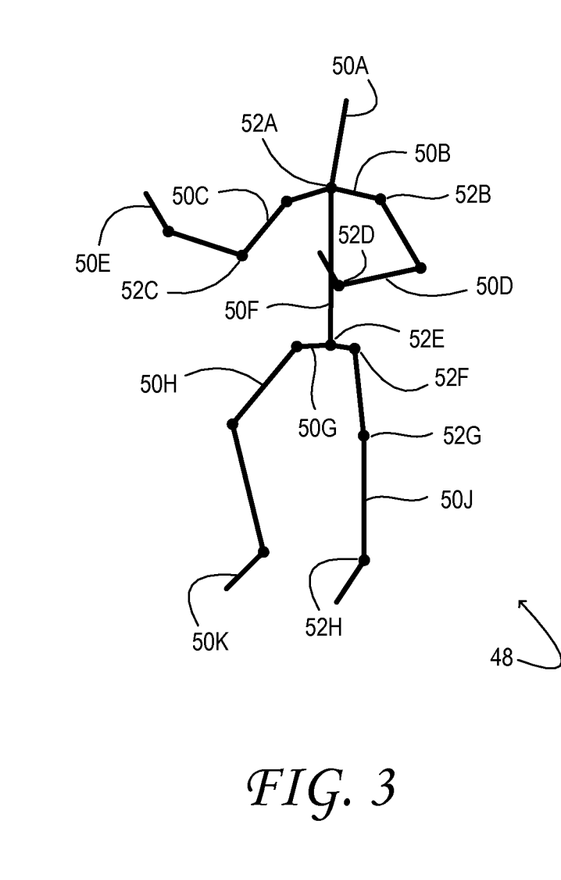
FIGS. 3 and 4 show aspects of an example virtual skeleton used for posture recognition.

Thereafter, a virtual skeleton is fit to the pixels of depth video that correspond to the user. FIG. 3 shows an example virtual skeleton 48. The virtual skeleton includes a plurality of skeletal segments 50 pivotally coupled at a plurality of joints 52. In some embodiments, a body-part designation may be assigned to each skeletal segment and/or each joint. In FIG. 3, the body-part designation of each skeletal segment 50 is represented by an appended letter: A for the head, B for the clavicle, C for the upper arm, D for the forearm, E for the hand, F for the torso, G for the pelvis, H for the thigh, J for the lower leg, and K for the foot. Likewise, a body-part designation of each joint 52 is represented by an appended letter: A for the neck, B for the shoulder, C for the elbow, D for the wrist, E for the lower back, F for the hip, G for the knee, and H for the ankle. Naturally, the arrangement of skeletal segments and joints shown in FIG. 3 is in no way limiting. A virtual skeleton consistent with this disclosure may include virtually any type and number of skeletal segments and joints.

Figure 4:
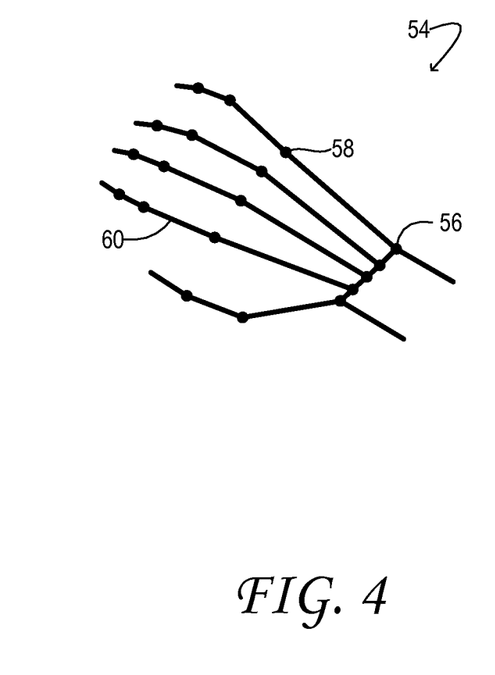

In a more particular embodiment, point clouds (portions of a depth map) corresponding to the user's hands may be further processed to reveal the skeletal substructure of the hands. FIG. 4 shows an example hand portion 54 of a user's virtual skeleton 48. The hand portion includes wrist joints 56, finger joints 58 and adjoining finger segments 60.

Via any suitable minimization approach, the lengths of the skeletal segments and the positions and rotational angles of the joints may be adjusted for agreement with the various contours of a depth map. In this way, each joint is assigned various parameters—e.g., Cartesian coordinates specifying joint position, angles specifying joint rotation, and additional parameters specifying a conformation of the corresponding body part (hand open, hand closed, etc.). The virtual skeleton may take the form of a data structure including any, some, or all of these parameters for each joint. This process may define the location and posture of the imaged human subject. Some skeletal-fitting algorithms may use the depth data in combination with other information, such as color-image data and/or kinetic data indicating how one locus of pixels moves with respect to another. In the manner described above, a virtual skeleton may be fit to each of a sequence of frames of depth video. By analyzing positional change in the various skeletal joints and/or segments, the corresponding movements—e.g., gestures or actions of the imaged user—may be determined. Static postures and changes in posture over consecutive frames of the video (i.e., gestures) are recognized, accordingly, and furnished by posture-recognition engine 40 to OS 34, as a form of user input.

The foregoing description should not be construed to limit the range of approaches usable to construct a virtual skeleton 48, for a virtual skeleton may be derived from a depth map in any suitable manner without departing from the scope of this disclosure. Moreover, despite the advantages of using a virtual skeleton to model user 12, even this aspect is by no means necessary. In lieu of a virtual skeleton, raw point-cloud data may be used directly to provide suitable posture information and/or other, non-skeletal, constructs may be used to model user 12.

Returning now to FIG. 2, eye-tracking engine 42 is configured to receive video from flat-image camera 28 (at least), and to process image data from the flat-image camera to locate one or more ocular features of user 12. Such features may include the pupils, or one or more glints reflected from the corneas. Based on the size and location of the ocular features in the image data, the eye-tracking engine computes the center point of each pupil in real-world, 3D coordinates, and optionally, the gaze vector V from each eye. In examples where the gaze vector is determined for both the right and left eyes concurrently, the point of intersection of the right and left gaze vectors may be used to define the user's focal point in three dimensions. Face-recognition engine 44 may be used to positively identify one or more users based on comparison to stored facial features of one or more known users. Despite the utility of the eye-tracking and face-recognition engines in providing additional forms of natural user input for certain applications, these components are not strictly necessary, and may be omitted in some embodiments.

User-input system 32 also includes user-recognition engine 62 arranged upstream of posture-recognition engine 40. The user-recognition engine receives live video from depth camera 26 and processes the video to identify pixels corresponding to a user. The user-recognition engine submits such pixels for further processing in the posture-recognition engine, while pixels not corresponding to a user are masked or otherwise not provided to the posture-recognition engine.

To determine whether a given pixel corresponds to a user, user-recognition engine 62 invokes background-removal engine 64. The background-removal engine is configured to distinguish background from foreground based on any appropriate criteria. In some embodiments, the background-removal engine may enact floor and/or wall detection, default depth thresholding, and/or heuristic analysis, for example.

Figure 5:
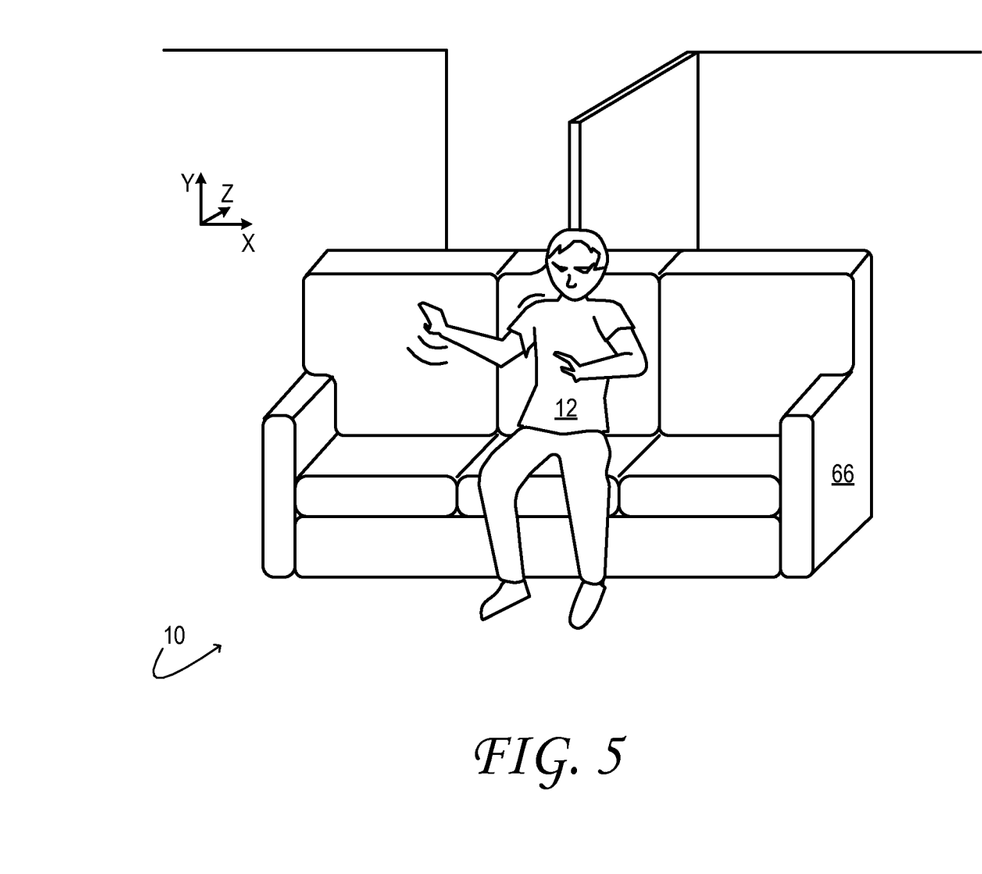
FIG. 5 shows aspects of another example environment in which a user's posture is recognized and provided as input to a computer system.

Even when the foregoing techniques are applied, some common use scenarios make it difficult to cleanly separate the user from his or her surroundings. FIG. 5 illustrates an example scenario in which a user 12 is seated on couch 66. More generally, the user may be situated on a chair, bed, or any type of furniture that is not completely covered by the user. This scenario highlights the operational tension between erroneously associating a portion of the background furniture with the user, and erroneously rejecting a portion of the user, such as an arm resting on an armrest.

To address this issue, while providing other advantages, background-removal engine 64 of FIG. 2 is configured to distinguish background from foreground using background model 68 of environment 10. In this manner, posture-recognition engine 40 may ignore a background portion of the depth video, but recognize posture of a user in front of the background portion. In other words, the background-removal engine may be configured to furnish only the foreground portion of the depth video to the posture-recognition engine. In some embodiments, the background-removal engine may be configured to mask, or 'green screen', each and every pixel of the background portion. Update engine 70 gathers and maintains statistics on the imaged scene that enables background-removal engine 64 to assess and reassess whether a given pixel is background or foreground. Using the updated background model 68 as a reference, the background-removal engine is less likely to erroneously associate background content with a user. Accordingly, the user-recognition engine 62 may be configured to sample a relatively large area of pixels around each potential user, for increased reliability in posture recognition.

Continuing in FIG. 2, background model 68 may be stored in a computer memory device of computer system 16 and maintained in an updated state via update engine 70. In one embodiment, the computer-memory device storing the background model may be non-volatile, such that the background model is preservable over one or more reboots of the computer system. This feature enables a background model accumulated during a previous user session to be reloaded and updated in the current user session. Doing so reduces latency and compute effort relative to any approach in which a background model is assembled afresh at every reboot.

Background model 68 includes an accumulator matrix 72 and a trusted matrix 74. The trusted matrix encodes a plurality of trusted background coordinates derived from the depth video and spanning the field of view of depth camera 26. The static background portion of the environment 10 is effectively bounded by the trusted coordinates. Each matrix independently represents, for each pixel $(X_i, Y_i)$ of an imaged scene, the average background depth $Z_i$ of that pixel, the average background IR brightness $H_i$, and standard deviations $\delta Z_i$ and $\delta H_i$. The accumulator and trusted matrices may be identical but for the fact that the accumulator matrix stores a live update of the background model, whereas the trusted matrix stores a reliable background model exposable to a consumer process, such as background-removal engine 64.

As noted above, update engine 70 is configured to update background model 68. In particular, the update engine judiciously accumulates every frame of video acquired by depth camera 26 into accumulator matrix 72. For each pixel of a given frame, the update engine makes decisions that determine whether that pixel contributes to background model 68. As described in further detail below, the decisions are based largely on the content of the observed pixel itself (depth, brightness, and associated standard deviations), but may also depend on other pixels of the current frame, and on other factors. In some embodiments, optional head-proposal engine 76 also influences whether and how a given pixel is accumulated into the accumulator matrix. The head-proposal engine is configured to identify the head of a user and thereby intuit a probable location of the user's body (vide infra).

Figure 6:
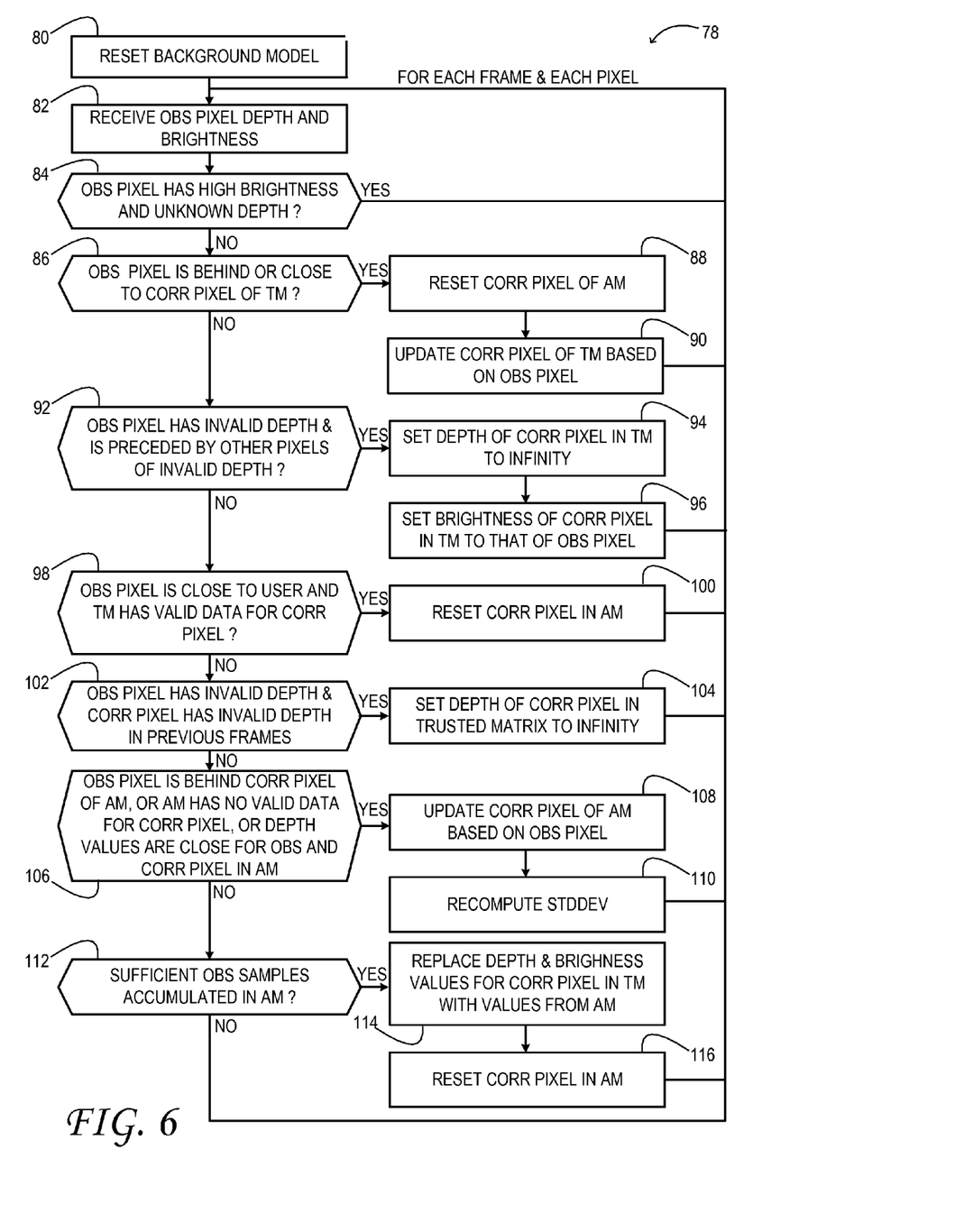
FIG. 6 illustrates an example method to generate and maintain a background model of an imaged scene.

FIG. 6 illustrates an example method 78 to generate and maintain a background model 68 of an imaged scene. At 80 of method 78, accumulator matrix 72 and trusted matrix 74 of background model 68 (AM and TM, respectively, in FIG. 6) are reset. In other words, depth, brightness, and standard-deviation data for each pixel are set to zero. This action is typically not taken at every reboot of computer system 16 or peripheral camera system 22. Rather, it may be taken when the peripheral camera system is installed or moved to a different location, or when it is determined that the background model is somehow corrupted. If the reset of the accumulator and trusted matrices is omitted, which may be the case for a typical reboot, then previously stored values for each pixel of the matrices may be reloaded from non-volatile memory (e.g., a hard disc), so that the previous values may continue to be used, updated, etc., as noted above.

The subsequent steps of method 78 are enacted for each of a series of consecutive frames of the depth video from depth camera 26, and for each pixel of each frame (the observed pixel in the following description). At 82, accordingly, depth video of an environment is received from a depth camera via a hardware interface of the computer system. In particular, depth and brightness for each observed pixel is received.

At 84 it is determined whether the observed pixel has an above-threshold brightness and an unknown depth. If so, no further action is taken on the observed pixel, and the next pixel is selected. This action prevents objects very near to the camera from interfering with background model accumulation.

At 86 it is determined whether the observed pixel is behind or close, both in depth and in brightness, to the corresponding background pixel of trusted matrix 74. If this is the case, then the corresponding pixel of accumulator matrix 72 is reset, at 88, and the depth and brightness of the corresponding pixel of trusted matrix 74 is updated at 90, based on the observed pixel. This action typically will move the corresponding pixel of the trusted matrix closer to the observed pixel.

At 92 it is determined whether the observed pixel has an invalid depth and is preceded by other pixels with invalid depth in previous frames of the video. If so, then the depth of the corresponding pixel in the trusted matrix is reset to infinity, at 94, and the brightness at 96 is reset to that of the observed pixel.

At 98 it is determined whether the observed pixel is close to a tracked user or to an expected user location, based on a strong head proposal from head-proposal engine 76, and whether the trusted matrix contains valid data for that pixel. If these conditions are met, then, at 100, the corresponding pixel is reset in the accumulator matrix. In this manner, a region close to a user's location is not accumulated into the accumulator matrix, which is appropriate because the data in that region cannot be confidently associated with the background. In another embodiments, the actual player mask produced by the user recognition engine may be used to exclude a nearby region from accumulation.

At 102 it is determined whether the observed pixel has invalid depth and whether the depth of that pixel was also invalid in a threshold number of previous frames of the video. If so, then the depth of the pixel in the trusted matrix is set to infinity, at 104 of method 78.

Subsequent decisions of method 78 determine whether the observed pixel is to be accumulated in accumulator matrix 72. At 106 it is determined whether the observed pixel lies behind the current average depth of the corresponding pixel in the accumulator matrix, or whether the accumulator matrix contains no valid data for that pixel, or whether the observed and accumulated depth values are close to each other (i.e., within a threshold distance). If any of these conditions are met, then the depth and brightness values in the accumulator matrix, at 108, are updated based on the observed pixel, and the standard deviations are recomputed at 110 to reflect the update.

At 112 it is determined whether sufficient samples corresponding to the observed pixel have been accumulated in accumulator matrix 72. If this is the case, then the depth and brightness values for the corresponding pixel stored in the trusted matrix 74 are replaced, at 114, with those of accumulator matrix 72. Various thresholding schemes may be used to determine whether a sufficient number of samples has been accumulated. In one embodiment, several minutes of accumulation may be required to replace values in the trusted matrix if valid data already are present there. Otherwise, several seconds of accumulation may be sufficient. Several seconds may be sufficient if, for example, an above-threshold area of the image has changed by an above-threshold amount, thus suggesting a moved camera system and/or rearranged environment.

In this manner a trusted coordinate of the background model may be moved to greater depth if an observed pixel is behind the trusted coordinate over a first duration, but retained if the observed pixel depth is in front of the trusted coordinate over the first duration. However, the trusted coordinate may be moved to lesser depth if the observed pixel depth is in front of the trusted coordinate over a second, longer duration. In other words, the background model more readily self adjusts to exclude more background than to include more background. In one embodiment, the second duration may be reduced if the observed pixel and the trusted coordinate have similar infrared brightness, and prolonged if the observed pixel and the trusted coordinate have different infrared brightness. Each time a trusted value is replaced, the corresponding pixel of accumulator matrix 72 is reset, at 116 of method 78.

Figure 7:
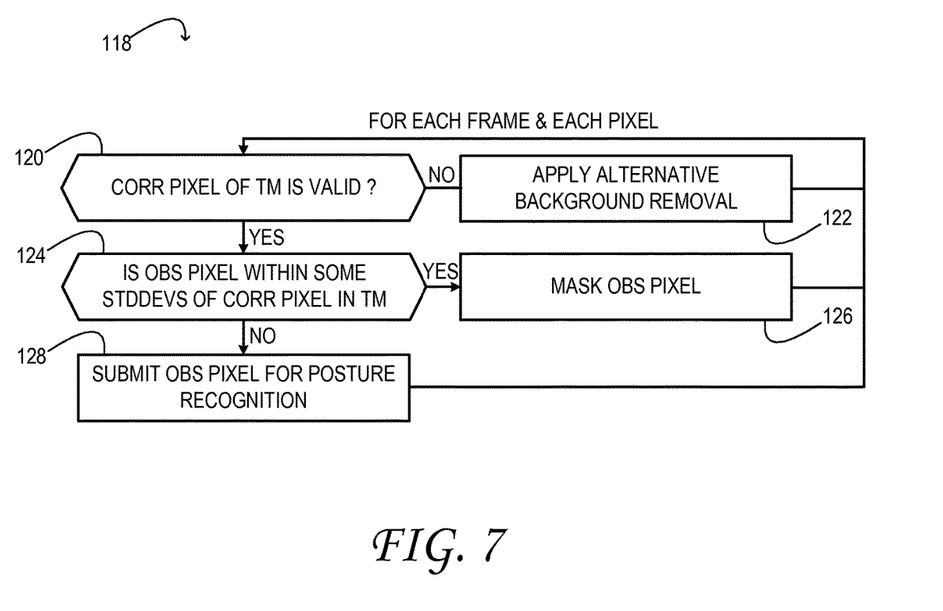
FIG. 7 illustrates an example method to detect input from a computer-system user using background removal based on a background model.

FIG. 7 illustrates an example method 118 to provide input from a computer-system user using background removal based on background model 68. Like the foregoing method 78, method 118 may be enacted for each of a series of consecutive frames of the depth video from depth camera 26, and for each pixel of each frame (the observed pixel in the following description).

At 120 of method 118 it is determined whether trusted matrix 74 includes a valid pixel corresponding to the observed pixel. If no valid pixel is found, then background-removal engine 64 will apply, at 122, an alternative algorithm to determine whether the observed pixel belongs to the user, or is part of the background. The alternative algorithm may be based on default depth thresholding or heuristics, for example. If a valid pixel is found, however, then the background-removal engine compares at least the depth value of the observed pixel to a corresponding pixel of trusted matrix 74. In some embodiments, IR brightness values are compared as well. For instance, if both the depth and brightness are within a threshold number of standard deviations of the corresponding pixels of the trusted matrix, at 124, then background-removal engine 64 masks that pixel, at 126, or otherwise removes it from consideration by posture-recognition engine 40. Otherwise the observed pixel is submitted, at 128, to the posture-recognition engine.

The foregoing method descriptions should not be construed as limiting in any way, for numerous variations and extensions are contemplated as well. For example, in cases where a given frame of video includes significant 'zero' data or saturated IR brightness, the act of updating background model 68 may be suspended, and trusted matrix 74 may continue to be used without an update for a suitable period of time. If this condition persists for an extended period (e.g., ten seconds), then the background model may be reset. This aspect provides a mechanism for testing and a troubleshooting tool for product support if the background model is suspected to contain corrupt data. Methods 78 and 118 are usable in combination—i.e., executed in the same user-input system at the same time. Nevertheless, each methods may also be usable independent of the other—e.g., paired with an alternative companion method.

As evident from the foregoing description, the methods and processes described herein may be tied to a computer system of one or more computing machines. Such methods and processes may be implemented as a computer-application program or service, an application-programming interface (API), a library, and/or other computer-program product. The reader is again referred to FIG. 2, which shows in simplified form a non-limiting example of a computer system 16 configured to enact the methods and processes described herein. The computer system includes a logic machine 130 and a data-storage, or computer-memory machine 132. The computer system also includes a display 14, a communication machine 134, and various components not shown the drawing.

Logic machine 130 includes one or more physical logic devices configured to execute instructions. A logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

Logic machine 130 may include one or more processors configured to execute software instructions. Additionally or alternatively, a logic machine may include one or more hardware or firmware logic machines configured to execute hardware or firmware instructions. Processors of a logic machine may be single-core or multi-core, and the instructions executed thereon may be configured for sequential, parallel, and/or distributed processing. Individual components of a logic machine optionally may be distributed among two or more separate devices, which may be remotely located and/or configured for coordinated processing. Aspects of a logic machine may be virtualized and executed by remotely accessible, networked computing devices configured in a cloud-computing configuration.

Computer-memory machine 132 includes one or more physical, computer-memory devices configured to hold instructions executable by an associated logic machine 130 to implement the methods and processes described herein. When such methods and processes are implemented, the state of the computer-memory machine may be transformed—e.g., to hold different data. A computer-memory machine may include removable and/or built-in devices; it may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. A computer-memory machine may include volatile, nonvolatile, dynamic, static, read/write, read-only, random-access, sequential-access, location-addressable, file-addressable, and/or content-addressable devices.

It will be appreciated that computer-memory machine 132 includes one or more physical devices. However, aspects of the instructions described herein alternatively may be propagated by a communication medium (e.g., an electromagnetic signal, an optical signal, etc.), as opposed to being stored via a storage medium.

Aspects of logic machine 130 and computer-memory machine 132 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms 'module', 'program', and 'engine' may be used to describe an aspect of a computer system implemented to perform a particular function. In some cases, a module, program, or engine may be instantiated via a logic machine executing instructions held by a computer-memory machine. It will be understood that different modules, programs, and engines may be instantiated from the same application, service, code block, object, library, routine, API, function, etc. Likewise, the same module, program, or engine may be instantiated by different applications, services, code blocks, objects, routines, APIs, functions, etc. A module, program, or engine may encompass individual or groups of executable files, data files, libraries, drivers, scripts, database records, etc.

Display 14 may be used to present a visual representation of data held by computer-memory machine 132. This visual representation may take the form of a graphical user interface (GUI). As the herein described methods and processes change the data held by the computer-memory machine, and thus transform the state of the computer-memory machine, the state of display 14 may likewise be transformed to visually represent changes in the underlying data. Display 14 may include one or more display devices utilizing virtually any type of technology. Such display devices may be combined with logic machine 130 and/or computer-memory machine 132 in a shared enclosure, or such display devices may be peripheral display devices.

Communication machine 134 may be configured to communicatively couple the computer system to one or more other machines, including server computer systems. The communication machine may include wired and/or wireless communication devices compatible with one or more different communication protocols. As non-limiting examples, a communication machine may be configured for communication via a wireless telephone network, or a wired or wireless local- or wide-area network. In some examples, a communication machine may allow a computing machine to send and/or receive messages to and/or from other devices via a network such as the Internet.

It will be understood that the configurations and/or approaches described herein are exemplary in nature, and that these specific examples or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

One aspect of this disclosure is directed to a computer system comprising a hardware interface, a computer-memory device, an update engine, and a posture-recognition engine. The hardware interface is configured to receive depth video of an environment from a camera. The computer-memory device stores a background model of the environment preservable over a reboot of the computer system, the background model including a plurality of trusted coordinates derived from the depth video. The update engine is configured to update the background model, including moving a trusted coordinate to greater depth if an observed pixel depth is behind the trusted coordinate over a first duration, but retaining the trusted coordinate if the observed pixel depth is in front of the trusted coordinate over the first duration, and moving the trusted coordinate to lesser depth if the observed pixel depth is in front of the trusted coordinate over a second, longer duration. The posture-recognition engine is configured to ignore a background portion of the depth video but to recognize posture of a user in front of the background portion, the background portion bounded by the plurality of trusted coordinates of the background model.

In some implementations of the above computer system, the depth video includes a time-resolved series of depth images and a time-resolved series of infrared brightness images. In some implementations, the camera is a time-of-flight depth camera. In some implementations, the trusted coordinates are encoded in a trusted matrix of pixels spanning a field of view of the camera, the trusted matrix representing average depth and infrared brightness for each pixel. In some implementations, the background model includes an accumulator matrix of pixels spanning the field of view of the camera, the accumulator matrix representing average depth, infrared brightness, and standard deviations of the average depth and infrared brightness for each pixel. In some implementations, the second duration may be reduced if the observed pixel and the trusted coordinate have similar infrared brightness, and the second duration is prolonged if the observed pixel depth and the trusted coordinate have different infrared brightness. Some implementations of the above computer system further comprise a background-removal engine configured to exclude the background portion from the depth video furnished to the posture-recognition engine. In some implementations, the background-removal engine is configured to mask the depth video at and behind the background portion. In some implementations, the posture-recognition engine is further configured to recognize a posture of the user and to furnish the posture as input to an operating system or application of the computer system.

Another aspect of this disclosure is directed to a computer system comprising a hardware interface, a computer-memory device, an update engine, and a posture-recognition engine. The hardware interface is configured to receive depth video of an environment from a camera. The computer-memory device stores an accumulator matrix and a trusted matrix preservable over a reboot of the computer system, the accumulator and trusted matrices each representing depth and brightness values for each of a plurality of pixels in a field of view of the camera, the depth and brightness values derived from the depth video and representing a static background of the environment. The update engine is configured to update the accumulator and trusted matrices, including updating a pixel of the accumulator matrix by accumulating into that pixel a corresponding, observed pixel, and replacing a corresponding pixel of the trusted matrix with the pixel of the accumulator matrix when a threshold number of observed pixels are accumulated therein, the threshold number being greater if the corresponding pixel of the trusted matrix is valid and lower if the corresponding pixel of the trusted matrix is invalid. The posture-recognition engine is configured to ignore a background portion of the depth video but to recognize posture of a user in front of the background portion, the background portion bounded by the depth values of the trusted matrix.

In some implementations of the above computer system, the update engine is further configured to reset the pixel of the accumulator matrix after the corresponding pixel of the trusted matrix is replaced. In some implementations, the accumulator matrix represents, for each pixel, a standard deviation of the depth and infrared brightness for that pixel, and the update engine is further configured to recompute the standard deviations each time the pixel of the accumulator matrix is updated. In some implementations, the update engine is configured to update the pixel of the accumulator matrix only if the corresponding observed pixel is behind that pixel, or if the accumulator matrix has no valid data for that pixel, or if that pixel is close in depth and brightness to the corresponding observed pixel. In some implementations, the update engine is further configured to set the depth of the corresponding pixel of the trusted matrix to infinity if the corresponding observed pixel has invalid depth and the current and previous frames of the video. In some implementations, the update engine is further configured to reset the pixel of the accumulator matrix if the corresponding observed pixel is close to the user and the corresponding pixel of the trusted matrix has valid depth and brightness. In some implementations, the update engine is further configured to set the depth of the corresponding pixel of the trusted matrix to infinity and set the brightness to that of the corresponding observed pixel if the corresponding observed pixel has invalid depth in current and previous frames of the video. In some implementations, the update engine is further configured to reset the pixel of the accumulator matrix and to update the corresponding pixel of the trusted matrix based on the corresponding observed pixel if the corresponding observed pixel is behind or close to the corresponding pixel of the trusted matrix.

Another aspect of this disclosure is directed to a method to provide user input to a computer system. Enacted in a computer system operatively coupled to a camera system via a hardware interface, the method comprises acts of: receiving depth video of an environment from a camera via the hardware interface; storing a background model of the environment preservable over a reboot of the computer system, the background model including a plurality of trusted coordinates extracted from the depth video; updating the background model, including moving a trusted coordinate to greater depth if an observed pixel depth is behind the trusted coordinate over a first duration, but retaining the trusted coordinate if the observed pixel depth is in front of the trusted coordinate over the first duration, and moving the trusted coordinate to lesser depth if the observed pixel depth is in front of the trusted coordinate over a second, longer duration; and ignoring a background portion of the depth video but recognizing posture of a user in front of the background portion, the background portion bounded by the plurality of trusted coordinates of the background model.

In some implementations of the above method, the background model is updated for each of a series of consecutive frames of the depth video and for each pixel of each frame. In some implementations, ignoring the background portion includes masking the observed pixel depth if the observed pixel depth is within the threshold number of standard deviations from the trusted coordinate.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computer system comprising:
   a hardware interface configured to receive depth video of an environment from a camera;
   a computer-memory device storing a background model of the environment preservable over a reboot of the computer system, the background model including a plurality of trusted coordinates derived from the depth video;
   an update engine configured to update the background model, including moving a trusted coordinate to greater depth if an observed pixel depth is behind the trusted coordinate over a first duration, but retaining the trusted coordinate if the observed pixel depth is in front of the trusted coordinate over the first duration, and moving the trusted coordinate to lesser depth if the observed pixel depth is in front of the trusted coordinate over a second, longer duration; and
   a posture-recognition engine configured to ignore a background portion of the depth video but to recognize posture of a user in front of the background portion, the background portion bounded by the plurality of trusted coordinates of the background model.

2. The computer system of claim 1, wherein the depth video includes a time-resolved series of depth images and a time-resolved series of infrared brightness images.

3. The computer system of claim 1, wherein the camera is a time-of-flight depth camera.

4. The computer system of claim 1, wherein the trusted coordinates are encoded in a trusted matrix of pixels spanning a field of view of the camera, the trusted matrix representing average depth and infrared brightness for each pixel.

5. The computer system of claim 4, wherein the background model includes an accumulator matrix of pixels spanning the field of view of the camera, the accumulator matrix representing average depth, infrared brightness, and standard deviations of the average depth and infrared brightness for each pixel.

6. The computer system of claim 1, wherein the second duration is reduced if the observed pixel and the trusted coordinate have similar infrared brightness, and wherein the second duration is prolonged if the observed pixel depth and the trusted coordinate have different infrared brightness.

7. The computer system of claim 1, further comprising a background-removal engine configured to exclude the background portion from the depth video furnished to the posture-recognition engine.

8. The computer system of claim 7, wherein the background-removal engine is configured to mask the depth video at and behind the background portion.

9. The computer system of claim 1, wherein the posture-recognition engine is further configured to recognize a posture of the user and to furnish the posture as input to an operating system or application of the computer system.

10. In a computer system operatively coupled to a camera system via a hardware interface, a method to provide user input to the computer system, the method comprising:
    receiving depth video of an environment from a camera via the hardware interface;
    storing a background model of the environment preservable over a reboot of the computer system, the background model including a plurality of trusted coordinates extracted from the depth video;
    updating the background model, including moving a trusted coordinate to greater depth if an observed pixel depth is behind the trusted coordinate over a first duration, but retaining the trusted coordinate if the observed pixel depth is in front of the trusted coordinate over the first duration, and moving the trusted coordinate to lesser depth if the observed pixel depth is in front of the trusted coordinate over a second, longer duration; and
    ignoring a background portion of the depth video but recognizing posture of a user in front of the background portion, the background portion bounded by the plurality of trusted coordinates of the background model.

11. The method of claim 10, wherein the background model is updated for each of a series of consecutive frames of the depth video and for each pixel of each frame.

12. The method of claim 10, wherein ignoring the background portion includes masking the observed pixel depth if the observed pixel depth is within the threshold number of standard deviations from the trusted coordinate.

* * * * *